Dec. 12, 1950        C. P. DAHL        2,533,921

VALVE ASSEMBLY

Filed Feb. 15, 1945        2 Sheets-Sheet 1

Inventor
Carl P. Dahl

By Mason, Porter & Diller
Attorneys

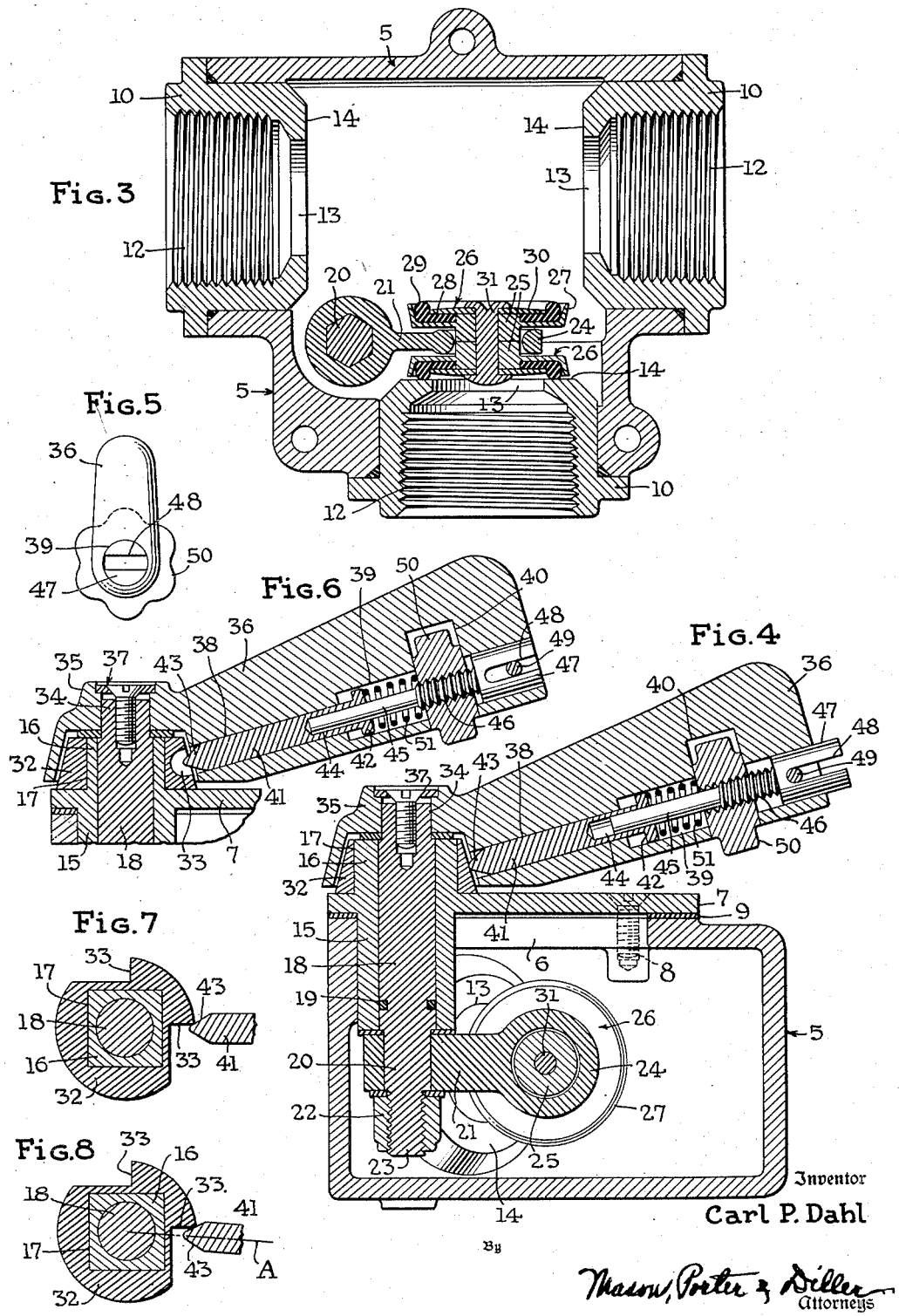

Patented Dec. 12, 1950

2,533,921

UNITED STATES PATENT OFFICE 2,533,921

VALVE ASSEMBLY

Carl P. Dahl, Cleveland, Ohio, assignor to The Parker Appliance Company, Cleveland, Ohio, a corporation of Ohio Application February 15, 1945, Serial No. 578,082

5 Claims. (Cl. 251—13)

The invention relates generally to valve assemblies and primarily seeks to provide a novel valve assembly in which there is included a casing having at least one inlet and one outlet port therein, a valve element shiftably mounted in the casing for controlling flow through the ports, and novel detent means for yieldably retaining the valve element in selected port controlling positions and including devices for effecting a locking of the valve element in a selected position.

An object of the invention is to provide an assembly of the character stated in which the valve element constitutes a swingably mounted flap valve and the locking devices are effective not only to secure the flap valve in a selected position but also to tightly press the same against its seat at said position.

Another object of the invention is to provide in an assembly of the character stated a flap valve supported for limited free movement so as to assure tight contact with its seat and including a yieldable seat engaging annulus for sealing against the seat in combination with a concentric relatively rigid annulus which will engage the seat and prevent additional deformation of the yieldable annulus after it has been deformed a desirable amount in sealing contact against said seat.

Another object of the invention is to provide an assembly of the character stated in which the flap valve is swingable for selective sealing contact with one or the other of two seats and has oppositely directed individual sets of deformable and relatively rigid annuli presented for engagement with said seats.

Another object of the invention is to provide in an assembly of the character stated a stationarily mounted collar having detent shoulders thereon corresponding to the casing port seat positions, and detent means including a spring pressed pin engageable with the shoulders for yieldably holding the valve element in selected positions and devices for forcing said pin into non-yielding contact with said shoulders for effecting a tight pressing and locking of the valve element against a selected seat.

With the above and other objects in view that will hereinafter appear, the nature of the invention will be more clearly understood by reference to the following detailed description, the appended claims, and the several views illustrated in the accompanying drawings.

In the drawings:

Figure 3 is a horizontal section taken through the port centers of the valve structure illustrated in Figures 1 and 2.

Figure 4 is a vertical cross section taken on the line 4—4 on Figure 1, the valve element and the attached handle being turned to a position in the plane of the section.

Figure 5 is a detail end elevation of the handle.

Figure 6 is a detail sectional view illustrating the handle conditioned for yieldably retaining the valve element in a selected position.

Figure 7 is a fragmentary horizontal section illustrating the manner in which the detent pin yieldably retains the valve element in a selected position.

Figure 8 is a view similar to Figure 7 illustrating the detent pin as adjusted for locking the valve element at a selected position and for tightly pressing it against its seat at said position.

Figure 1:
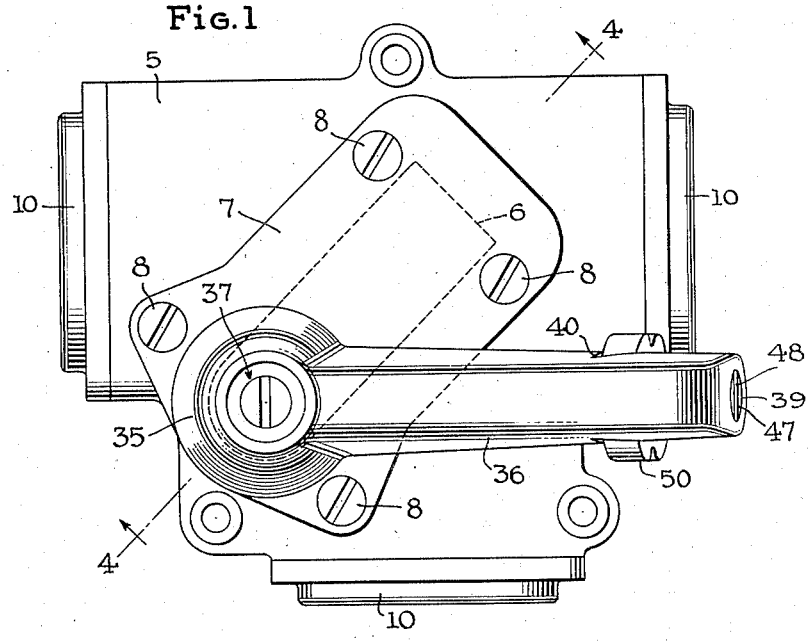
Figure 1 is a plan view illustrating a valve assembly embodying the invention.

In the example of embodiment of the invention herein disclosed the valve assembly includes a T-shaped casing 5 having a top opening 6 which is closed by a closure plate 7 secured to the casing by screws 8 in the manner clearly illustrated in Figures 1 and 4 of the drawings. A gasket 9 is interposed between the closure plate 7 and the top portion of the casing so as to provide a seal against leakage between the casing and closure.

Figure 2:
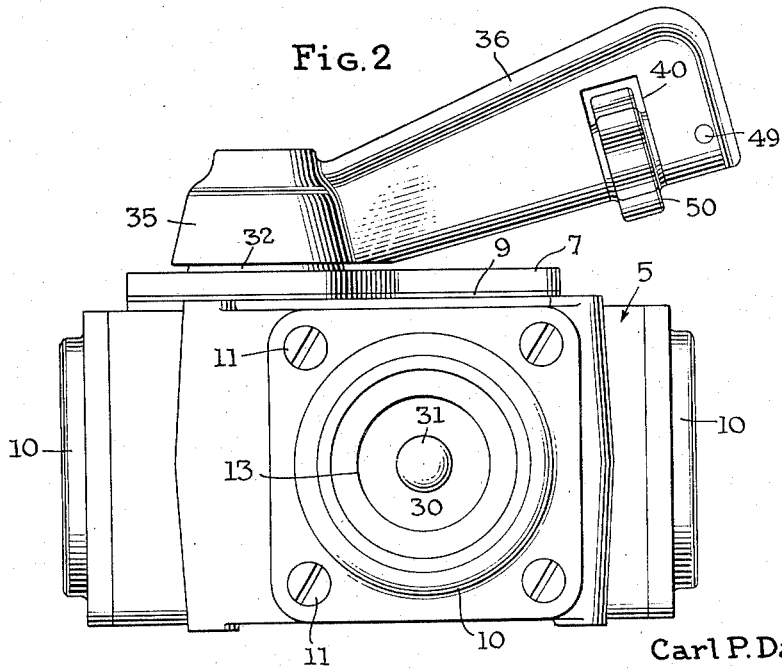
Figure 2 is a face view of the valve assembly illustrated in Figure 1.

The three casing openings provided by the T-shape thereof are equipped with port adapters 10, and these have their flanges screw secured as at 11 to the casing. See Figures 2 and 3. The port adapters are internally threaded as at 12 for proper connection with inlet, outlet and drain lines, and each adapter has a port opening 13 surrounded by a flat seat 14. In the form of the valve assembly herein illustrated, two of the ports may be axially aligned for connection with inlet and outlet lines, and the third or intermediate port transversely disposed for connection with a drain line, but it is to be understood that the invention comprehends various other arrangements of the casing ports according to the installations in which the valve assembly is to be used. It will be apparent by reference to Figure 3 of the drawings that the port controlling flap element employed in the form of valve assembly illustrated is a swingably mounted flap valve which is swingable through 90° for selective cooperation with one of the inlet or outlet ports and the drain port.

A cylindrical bearing 15 depends from the closure plate 7 in the manner clearly illustrated in Figure 4, and the closure plate also carries an upstanding bearing portion 16 which is squared at its exterior as at 17 for a purpose that will become apparent as this description progresses. See Figures 4, 6, 7 and 8.

A stem or shaft 18 is rotatably mounted in the bearing portions 15 and 16 and is annularly grooved to receive a gasket ring 19 which is effective to prevent leakage about said stem or shaft. The member 18 has a non-circular lower end portion 20 on which is removably mounted a flapper arm 21, the latter being rockably secured on the stem or shaft by a nut 22 which is threaded onto the lower externally threaded end extremity 23 of said stem or shaft. The flapper arm extends radially from the rotor member 18 and carries an open ring 24 at its free end. See Figures 3 and 4.

Within the open ring 24 of the flapper arm 21 are mounted abutting hubs 25 of two oppositely projecting valve disks 26, and it will be apparent by reference to Figures 3 and 4 of the drawings that each said disk includes an annular flange 27. Within the flange 27 of each disk 26 is mounted a deformable sealing ring 28 having an annular, seat engaging portion 29. The deformable sealing rings 28, 29 are held in place by retaining disks 30 and by an upset rivet 31 which passes through the abutting hubs 25 and said disks for holding the oppositely directed valve units in rigid assembly in the manner clearly illustrated in Figure 3. It will be observed by reference to Figure 3 that the hubs 25 are loose within the open ring 24 of the flapper arm so that the valve members will have loose play or self-seating freedom in their mounting on the flapper arm. It will also be apparent that the seat engaging annuli 29 of the valve members projects slightly beyond the flanges 27. In this manner the respective valve member annulus 29 will first engage a valve seat and effect a seal thereagainst, and the associated relatively non-yielding metallic flange 27 will contact the valve seat only after a certain amount of deformation of the sealing annulus 29 has taken place due to the high pressure seating effect of fluid against the closed flap valve member. As previously stated, the rotor 18 can be rocked to present the flap valve for sealing engagement with the drain port seat 14 as illustrated in Figure 3, or for engagement with the port seat 14 illustrated at the left in Figure 3.

A detent collar 32 is seated on the non-circular upper stem portion 17 in the manner clearly illustrated in Figures 4, 6, 7 and 8, and this collar is provided with side recesses providing detent shoulders 33 spaced 90° apart about the circumference of the collar and corresponding to the two selective positions to which the flap valve can be swung in the manner hereinbefore described.

The shaft or stem 18 also has a non-circular upper end extremity 34 whereon the hub 35 of a handle 36 is mounted, the handle being secured on the rotor 18 by means of a screw and washer equipment 37. It will be apparent by reference to Figures 4 and 6 of the drawings that the handle is provided with a bore 38 opening toward the detent collar 32, and a counterbore 39 opening through the end thereof. It will also be apparent that the handle is provided with a recess 40 traversing the counterbore 39 and extending through the bottom edge thereof.

A detent pin 41 is slidably mounted in the handle bore 38 and is equipped with an enlarged head 42 extending into the counterbore 39, and with a coniform detent nose 43 presented for cooperation with the detent collar 32. The pin 41 also has an axial bore or recess 44 extending through the outer end thereof for receiving a lock plunger 45. The lock plunger has an intermediate externally threaded portion 46 disposed opposite the handle recess 40, and an enlarged head 47 slidably mounted in the outer end of the counterbore. The head 47 is longitudinally slotted as at 48 to straddle a pin 49 mounted in the handle across the counterbore 39, and said pin serves to permit longitudinal movement of the head 47 in the counterbore while preventing rotation thereof. A turning nut 50 is held captive in the handle recess 40 and has a threaded bore for receiving the threaded portion of the lock plunger 45. A compression spring 51 is interposed between the detent pin head 42 and the nut 50 and serves to constantly urge the detent pin toward the detent collar 32.

By reference to Figures 4, 6, 7 and 8 of the drawings, it will be apparent that when the handle 36 is moved to place the flap valve against one of the two seats 14 with which it is engageable, the spring urged detent nose 43 will engage one or the other of the collar abutment shoulders 33 in the manner illustrated in Figures 6 and 7 and yieldably retain the selected placement of the valve. Should it be desired to lock the valve member in a selected seat engaging position, the nut 50 is turned so as to cause the lock pin 45 to move longitudinally into engagement with the bottom of the pin socket 44. When the lock pin 44 has engaged the bottom of the pin socket 44, retraction of the pin 41 will be prevented and the valve member will be locked in its selected position. Should it be desired to tightly press the valve element against its seat while it is locked in position the nut may be additionally turned so as to effect an inward forcing of the detent pin 41 in the manner illustrated in Figure 8, causing the coniform end nose thereof to engage the abutment shoulder 33 and tend additionally to swing the valve element as indicated by the dot and dash line A in Figure 8 so as to tightly press it against its seat.

While one form of the invention has been shown for purposes of illustration, it is to be clearly understood that various changes in the details of construction and arrangement of parts may be made without departing from the spirit and scope of the invention as defined in the appended claims.

I claim:

1. In a valve assembly, a casing having at least one inlet port and an outlet port and a seat surrounding each port, a valve element swingably mounted in the casing for controlling flow through the ports, and detent means for yieldably retaining the valve element in a selected flow controlling position and adjustable for locking the valve element in said selected position and for tightly pressing it against its seat.

2. In a valve assembly, a casing having at least one inlet port and an outlet port, a valve element shiftably mounted in the casing for controlling flow through the ports, and detent means for yieldably retaining the valve element in a selected flow controlling position and adjustable for locking the valve element in said selected position, said detent means including a spring pressed pin having a coniform end, a member engageable by said pin end as the valve element is shifted to a selected flow controlling position and having an abutment shoulder at said selected position engageable by said pin end for yieldably retaining the valve element in said selected position, and means for forcing said pin end against said abutment shoulder for locking the valve element in said selected position.

3. In a valve assembly, a casing having at least one inlet port and an outlet port and a seat surrounding each port, a valve element swingably mounted in the casing for controlling flow through the ports, and detent means for yieldably retaining the valve element in a selected flow controlling position and adjustable for locking the valve element in said selected position and for tightly pressing it against its seat, said detent means including a spring pressed pin having a coniform end, a member engageable by said pin end as the valve element is swung to a selected flow controlling position and having an abutment shoulder at said selected position engageable by said pin end for yieldably retaining the valve element in said selected position, and means for forcing said pin end against said abutment shoulder for locking the valve element in said selected position and in a manner tending additionally to swing said valve element and tightly press it against its seat.

4. In a valve assembly, a valve element shifting rotor, a detent collar having at least one abutment shoulder determining a selective position of said rotor, a handle secured to said rotor and having a bore therein opening toward said collar and a counterbore extending away from the bore through a wall of the handle and a recess traversing the counterbore, a detent pin having a coniform end extending from the bore for engagement with the collar abutment, a lock plunger mounted in the counterbore in position for engaging the pin and forcing it against said abutment, means holding the plunger against rotation, a nut held captive in the recess and through which the plunger is threaded and turnable for forcing the plunger against the pin or retracting it therefrom, and spring means constantly urging the pin toward the abutment.

5. In a valve assembly, a valve element shifting rotor, a detent collar having at least one abutment shoulder determining a selective position of said rotor, a handle secured to said rotor and having a bore therein opening toward said collar and a counterbore extending away from the bore through a wall of the handle and a recess traversing the counterbore, a detent pin having a coniform end extending from the bore for engagement with the collar abutment, a lock plunger mounted in the counterbore in position for engaging the pin and forcing it against said abutment, said pin having an end recess into which the plunger projects, a nut held captive in the recess and through which the plunger is threaded and turnable for forcing the plunger against the bottom of the pin recess or retracting it away from said bottom, pin and slot means preventing rotation of said plunger, and a compression spring interposed between the pin and the nut for constantly urging the pin toward the abutment.

CARL P. DAHL.

REFERENCES CITED

The following references are of record in the file of this patent:

UNITED STATES PATENTS

| Number | Name | Date |
|---|---|---|
| 234,866 | Forg | Nov. 30, 1880 |
| 260,490 | Martin et al. | July 4, 1882 |
| 532,935 | Woolery | Jan. 22, 1895 |
| 657,059 | Broomell | Aug. 28, 1900 |
| 666,215 | Van Nimwegen | Jan. 15, 1901 |
| 874,652 | Bailey | Dec. 24, 1907 |
| 907,729 | Broomell | Dec. 29, 1908 |
| 1,213,513 | Lohse | Jan. 23, 1917 |
| 2,107,200 | Kennon | Feb. 1, 1938 |
| 2,482,198 | Melichar | Sept. 20, 1949 |

FOREIGN PATENTS

| Number | Country | Date |
|---|---|---|
| 382,102 | Great Britain | of 1932 |